(12) United States Patent
Cheng et al.

(10) Patent No.: US 8,316,373 B2
(45) Date of Patent: Nov. 20, 2012

(54) CONCURRENT DATA PROCESSING AND ELECTRONIC BOOKKEEPING

(75) Inventors: Li Cheng, Hangzhou (CN); Xingjun Ni, Hangzhou (CN); Xu Zhao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 12/602,644

(22) PCT Filed: Jul. 23, 2009

(86) PCT No.: PCT/US2009/051481
§ 371 (c)(1),
(2), (4) Date: Dec. 1, 2009

(87) PCT Pub. No.: WO2010/014484
PCT Pub. Date: Feb. 4, 2010

(65) Prior Publication Data
US 2011/0119675 A1  May 19, 2011

(30) Foreign Application Priority Data

Jul. 29, 2008  (CN) .......................... 2008 1 0134773

(51) Int. Cl.
*G06F 9/46* (2006.01)
(52) U.S. Cl. ...................................................... 718/104
(58) Field of Classification Search ........................ None
See application file for complete search history.

(56) References Cited

U.S. PATENT DOCUMENTS

| | | | |
|---|---|---|---|
| 5,619,695 A | 4/1997 | Arbabi et al. | |
| 6,834,270 B1 * | 12/2004 | Pagani et al. | 705/65 |
| 7,219,347 B1 * | 5/2007 | Waddington | 718/104 |
| 7,296,133 B2 | 11/2007 | Swanberg | |
| 7,616,602 B2 | 11/2009 | Choi et al. | |
| 2001/0009002 A1 | 7/2001 | Logan et al. | |
| 2002/0015414 A1 | 2/2002 | Badalucco et al. | |
| 2002/0138376 A1 | 9/2002 | Hinkle | |
| 2002/0141397 A1 | 10/2002 | Piekarski et al. | |
| 2003/0048183 A1 | 3/2003 | Vollmer et al. | |
| 2004/0215578 A1 | 10/2004 | Das | |
| 2006/0117317 A1 * | 6/2006 | Crawford et al. | 718/104 |
| 2007/0011014 A1 | 1/2007 | Umapathy | |
| 2007/0055830 A1 | 3/2007 | Brenner | |
| 2007/0271570 A1 | 11/2007 | Brown et al. | |
| 2008/0263561 A1 | 10/2008 | Tagashira | |
| 2009/0076876 A1 * | 3/2009 | Knowles et al. | 705/8 |
| 2009/0217280 A1 | 8/2009 | Miller et al. | |

OTHER PUBLICATIONS

The Extended European Search Report mailed Nov. 3, 2011 for European patent application No. 09803402.8, 5 pages. The Chinese Office Action mailed Feb. 29, 2012 for Chinese patent application No. 200810134773.3, a counterpart foreign application of U.S. Appl. No. 12/602,644, 13 pages.

* cited by examiner

*Primary Examiner* — Emerson Puente
*Assistant Examiner* — Gregory Kessler
(74) *Attorney, Agent, or Firm* — Lee & Hayes, PLLC (57) ABSTRACT

Concurrent processing of business transaction data uses a time slice-centered scheme to cope with the situation where multiple requests demand a same resource at the same time. The method divides the processing time into multiple time slices, allocates each request to a corresponding time slice, and iteratively processing requests according to their corresponding time slices. The method does not require the requests to be processed one by one, and therefore does not cause a situation where other requests have to wait until the current request has been completely processed. Moreover, if a certain time slice has been allocated multiple requests of a same type, the requests are collectively processed as if they were a single request to reduce the frequencies of resource locking and unlocking, as well as the waiting time in a queue for resource access.

16 Claims, 7 Drawing Sheets

CONCURRENT DATA PROCESSING AND ELECTRONIC BOOKKEEPING

RELATED APPLICATIONS

This application is a national stage application of international patent application PCT/US09/51481 filed Jul. 23, 2009, entitled "CONCURRENT DATA PROCESSING AND ELECTRONIC BOOKKEEPING" which claims priority from Chinese patent application, Application No. 200810134773.3, filed Jul. 29, 2008, entitled "CONCURRENT DATA PROCESSING METHOD AND APPARATUS, AND ELECTRONIC BOOKKEEPING SYSTEM", which applications are hereby incorporated in their entirety by reference.

TECHNICAL FIELD

The present disclosure relates to data processing technologies, and particularly relates to methods and apparatuses for concurrent data processing, and electronic bookkeeping systems.

BACKGROUND

Concurrent processing is a common processing method in various business application systems. For example, highly concurrent transactions in a financial system, such as account processing, involve bookkeeping of payments made from one account to multiple accounts at the same time, or payments collected from multiple accounts to a single account at the same time.

In a typical bookkeeping process in trading, resource locks are first placed on accounts related to the trading (which may include a payment account of a buyer and a recipient account of a seller) to ensure that accuracy of data is not affected by other requests. Bookkeeping of the buyer's account, including voucher recording and balance update, is then performed, and followed by bookkeeping of the seller's account which also includes voucher recording and balance update. After the event of bookkeeping request is completely processed, the resource locks on the buyer's account and the seller's account are both released.

Generally, relevant accounts are required to be locked in each bookkeeping operation in order to avoid other operations from further operating on a currently processed account to cause data inconsistency. As volume of business continues to increase, certain accounts may have multiple concurrent operations in an instant period of time. However, only one thread out of all concurrency threads can possess a resource lock at a time, while other threads are required to wait until the lock is released to conduct bookkeeping accordingly. Under these circumstances, performance of a billing system is severely affected.

For example, if a thousand lottery players make payments to a lottery account at the same time, the events would cause approximately a thousand requests in a queue of the lottery account at that moment. If every request has to wait for its turn to obtain a locking right to be processed, business may be severely affected.

The problem of multiple requests demanding to occupy a same resource at the same time also exists in concurrent processing of other business systems to greatly affect the business efficiency.

SUMMARY

The present disclosure provides a method and an apparatus for concurrent processing of business transaction data. The method and the apparatus use a time slice-centered scheme to cope with the situation where multiple requests demand a same resource at the same time. The system divides the processing time into multiple time slices, allocates each request to a corresponding time slice, and iteratively processes requests according to their corresponding time slices. The system does not require the requests to be processed one by one, and therefore does not cause a situation where other requests have to wait until the current request has been completely processed. Moreover, if a certain time slice has been allocated multiple requests of a same type, the requests are collectively processed as if they were a single request to reduce the frequencies of resource locking and unlocking, as well as the waiting time in a queue for resource access.

In one embodiment, to iteratively process the requests, the system determines whether a present time slice has a request queue containing multiple requests of a same type, and if affirmative, collectively processes the multiple requests of the same type. The system may also determine whether a present request being processed satisfies a concurrency condition, and allocates the present request to the corresponding time slice only if affirmative. If the present request does not satisfy the concurrency condition, the system may process the present request according to a normal handling process. An exemplary concurrency condition is satisfied if the present request is among multiple requests directed towards a same account.

The requests may be allocated to the corresponding time slice according to the receipt time of each request.

In one exemplary embodiment, the processing system is implemented on a third-party payment processing platform. The requests for business data processing may be requests for financial transaction processing including financial account bookkeeping.

An apparatus of business transaction data processing is also provided to implement the disclosed method. According to another aspect of the disclosure, an electronic bookkeeping system implementing the disclosed method is provided. The apparatus or the system may be a part of a third-party payment processing platform.

The present disclosure applies the concept of time slice to network request processing, and allocates special network requests which are highly concurrent to different time periods for processing based on the receipt times of the requests. The method does not require each request be sequentially processed as conventional method does. Rather, the processing is controlled by a reiteration of the allocated time slices. All requests have their share to access the processing resources according to the terms of their corresponding time slices, and are not forced to wait until other requests have been completely processed.

Moreover, if a time slice has multiple requests of a same type, the multiple requests are collectively processed as if they were a single request. This reduces the frequencies of resource locking and unlocking, as well as the waiting time in a queue for resource access.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

In order to more clearly and easily understand the characteristics and the benefits of the present disclosure, the present disclosure is described below in further detail using accompanying figures and specific exemplary embodiments.

Described are a method and an apparatus of business transaction data processing. Herein, business transaction data processing refers to processing of data in business transactions involving multiple business accounts which require bookkeeping. A typical example of such business transactions is a process of making a payment by a buyer to the seller. In this business transaction, both a buyer's account and a seller's account are involved. The disclosed method and the apparatus are applicable to at least part of this business transaction. For example, the method and the apparatus may be applied in either a buyer's account system or a seller's account system, or both. When the business transaction is conducted from a third-party platform which holds the business accounts of both parties of the transaction, the method and the apparatus may be implemented on such a third-party platform to handle the business transactions involving the business accounts of both parties. As will be described below, the business accounts held on a third-party platform may be virtual accounts, which may be connected with external real bank accounts.

The disclosed method borrows and applies the concept of time slice to network request processing, and allocates special network requests which are highly concurrent to different time periods for processing to solve the problem of a same resource being occupied by a large number of processes at the same time, and improve processing efficiency. Moreover, requests that are combinable within a time slice are processed in combination, reducing frequencies of locking and unlocking of the same resource.

The method can be suitably used in concurrent business processing in various business systems, as explained in details using an example of concurrent account processing in a financial system. The financial system may include a network system of a financial institution and a financial data processing system which is based on a third-party transaction platform.

During the account processing of the financial system, two bookkeeping processes, one for a payment account and another for a recipient account, are involved in one billing request. Therefore, concurrent requests may be multiple payment requests, such as payment requests from multiple transactions submitted to a same recipient account at the same time. Concurrent requests may also be multiple payment collection requests, such as payment collection requests from multiple transactions submitted to a same payment account at the same time. Processing of these high-volume account involving high concurrency transactions (which may include recipient account and a payment account) is described below using the exemplary embodiments. In this description, the order in which a process is described is not intended to be construed as a limitation, and any number of the described process blocks may be combined in any order to implement the method, or an alternate method.

First Exemplary Embodiment

Figure 1:
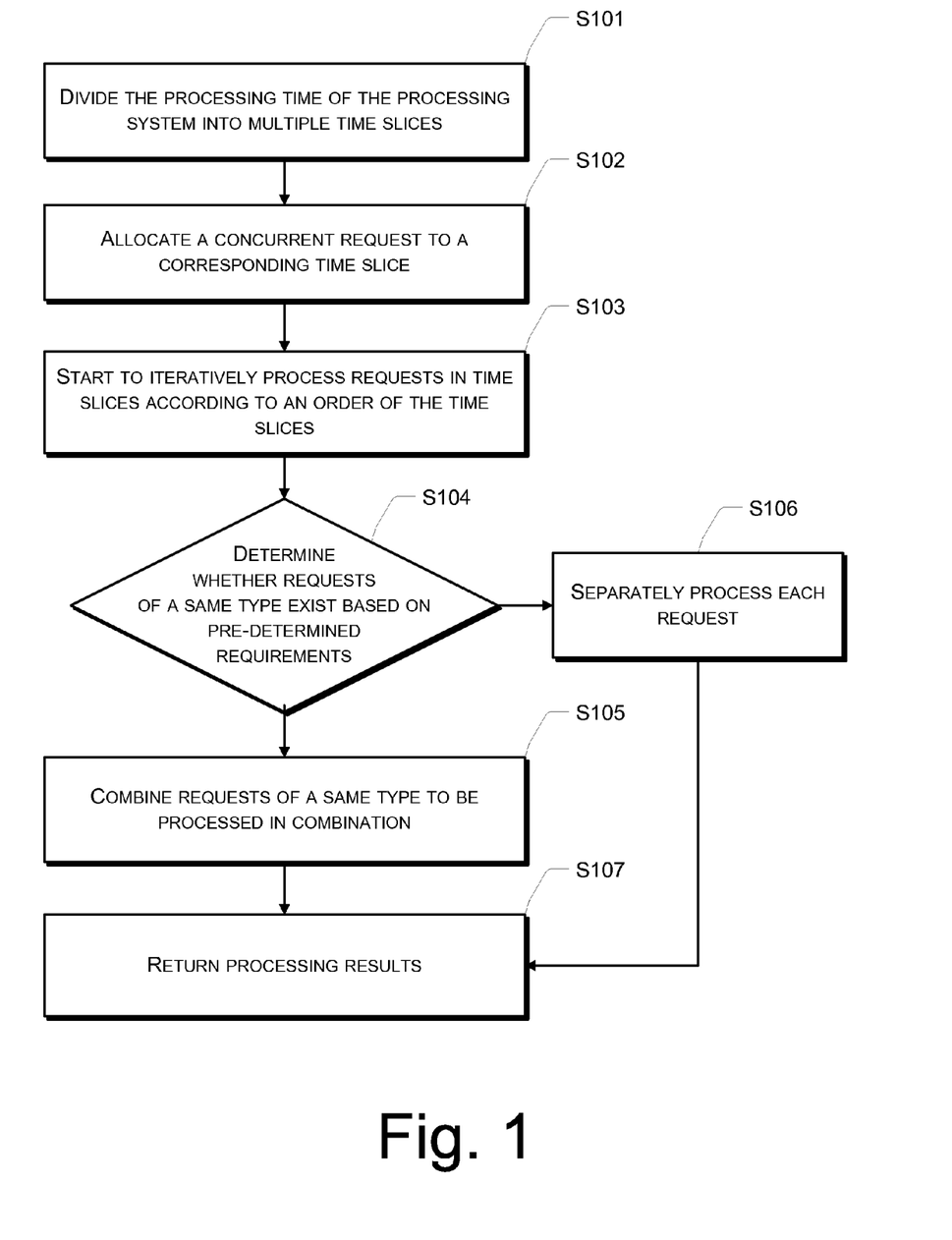
FIG. 1 shows a flow chart of a method of concurrent data processing in accordance with a first exemplary embodiment.

FIG. 1 shows a flow chart of a process 100 of concurrent data processing in accordance with a first exemplary embodiment. Requests directed towards a high-volume account involving high concurrency transaction are processed by a processing system. The process 100 is described as follows.

At block S101, the processing system divides the processing time into multiple time periods. Each time period is called a time slice. The processing time of the system refers to the time used by the processing system to process transaction requests.

At block S102, the processing system allocates a concurrent request to a corresponding time slice. The allocated concurrent request waits for the assigned corresponding time slice to be processed.

In practice, various allocation strategies, which primarily use division methods based on time periods, may be used for allocation. For example, a minute may be divided into sixty time slices in unit of seconds. Upon receiving a request, the system allocates the request to a time slice corresponding to the time of the request. For instance, if a request is received at the twentieth second, the request is allocated to the twentieth time slice for processing. If concurrent requests are received (i.e., multiple requests directed towards a certain high-volume account involving high concurrency transaction are received at the same time), the multiple concurrent requests are allocated to the same time slice.

At block S103, the system interactively processes the requests in corresponding time slices according to the order of the time slices.

As described below, the present disclosure provides a preferred method for processing requests in each time slice.

At block S104, to process a request queue of a present time slice, the system preferably determines whether there exist requests of a same type. The determination is made based on pre-determined requirements. If search requests exist, the process continues to S105. If such requests to not exist, the process proceeds to S106.

The requests of the same type refer to requests that are combinable for processing, such as payment requests that are directed towards a same account, payment collection requests that are directed towards a same account, and requests of a same type of transactions or requests of the same transaction that are directed towards a same account, etc.

At block S105, the requests of the same type, if determined to exist, are combined to be processed together.

At block S106, where there are no requests of a same type, each request is processed separately.

In general, bookkeeping of two accounts (e.g., a payment account and a recipient account) is involved in account processing. In order to completely process a request, each account needs to perform an account locking operation and unlocking operation. If requests are of a same type, the multiple requests directed towards a same account may be combined so that processing may be completed by performing a single operation of locking and unlocking. If requests are not of a same type, relevant accounts need to be locked and unlocked when each request is processed.

At block S107, the system returns a processing result.

The disclosed processing method uses a time slice-centered approach to solve the problem of concurrent occupation of a same resource and to improve concurrent processing efficiency of a system. A certain request gets its share of being processed when its corresponding time slice's turn arrives, regardless of the processing status of the other requests. In comparison, the existing technologies are request-centered and process requests in turn. When a request is being processed, the system is devoted to the current process to complete it, and other requests have no chance to be processed until the current request has been completely processed.

Moreover, in some preferred embodiments, the disclosed method processes the requests allocated to a same time slice efficiently. Requests of a same type within the same time slice are processed in combination. This reduces the number of separate processes, the frequency of locking and unlocking operations of a resource, as well as the waiting time in a queue for resource access.

Preferably, in a practical application, the process may further include a pre-processing procedure. Prior to allocating a concurrent request to a corresponding time slice, the procedure first identifies a request, and gives consideration to the identified information (e.g., the type of the request) when allocates the request.

In one embodiment, the processing unit may determine whether a present request being processed satisfies a concurrency condition, and allocate the present request to the corresponding time slice for time slice-based processing only if the determination is affirmative. If the present request does not satisfy the concurrency condition, the present request may not be allocated to a time slice but instead be processed according to a normal handling process. An exemplary concurrency condition is satisfied if the present request is among multiple requests directed towards a same account. This is described in further detail with reference to FIG. 2.

Figure 2:
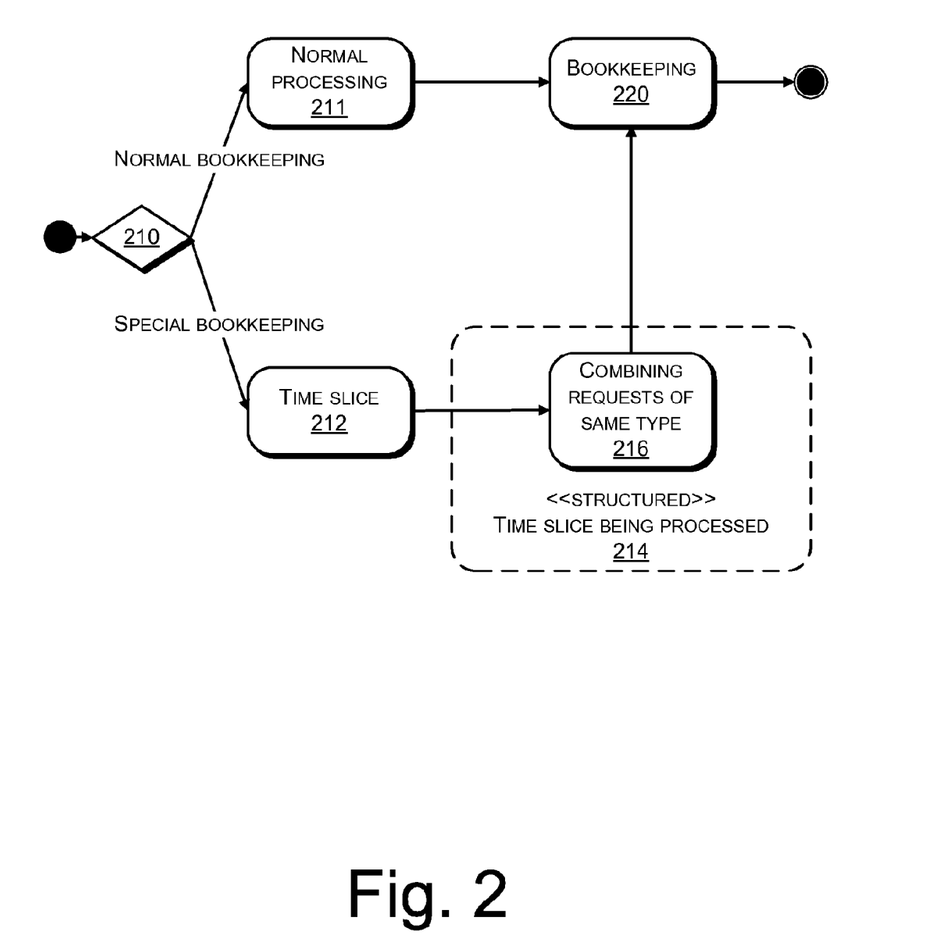
FIG. 2 shows a schematic diagram illustrating an exemplary processing technique in accordance with the present disclosure.

FIG. 2 shows a schematic diagram illustrating an exemplary processing technique 200 in accordance with the present disclosure. At a decision block 210 of processing a bookkeeping request, a system first determines whether a present request is a concurrent request based on pre-determined configuration information. If the present request is a concurrent request, the request is sent to a special bookkeeping process which allocates a corresponding time slice 212 to the request, which waits the turn of its corresponding time slice to be processed at 214. If requests of a same type exist in a same time slice, the requests are combined for processing at 216. Bookkeeping 220 is conducted when the allocated corresponding time slice is processed. The time-sliced process of 212, 214 and 216 may use any embodiment of the time-slice based processing technique disclosed herein (e.g., the process of FIG. 1). If the present request is determined at block 210 to be not a concurrent request, the request is sent to a normal process 211 for bookkeeping 220. Any available processing technique may be used for the normal process 211.

The above special bookkeeping refers to processing that is conducted specially for high-volume businesses or accounts. In order to distinguish which request needs to be specially processed, certain configuration information may be determined in advance. The configuration information defines which business is to be considered a high-volume business, and which type of data processing within the business is to be concurrent processing, etc. The configuration information can be defined according to the specific nature of the business, aiming to pick out highly concurrent processing requests send them to a special handling process for time slice-based processing.

The present disclosure further provides an exemplary apparatus of concurrent data processing to implement the method described herein. This is described with reference to FIG. 3 below.

Figure 3:
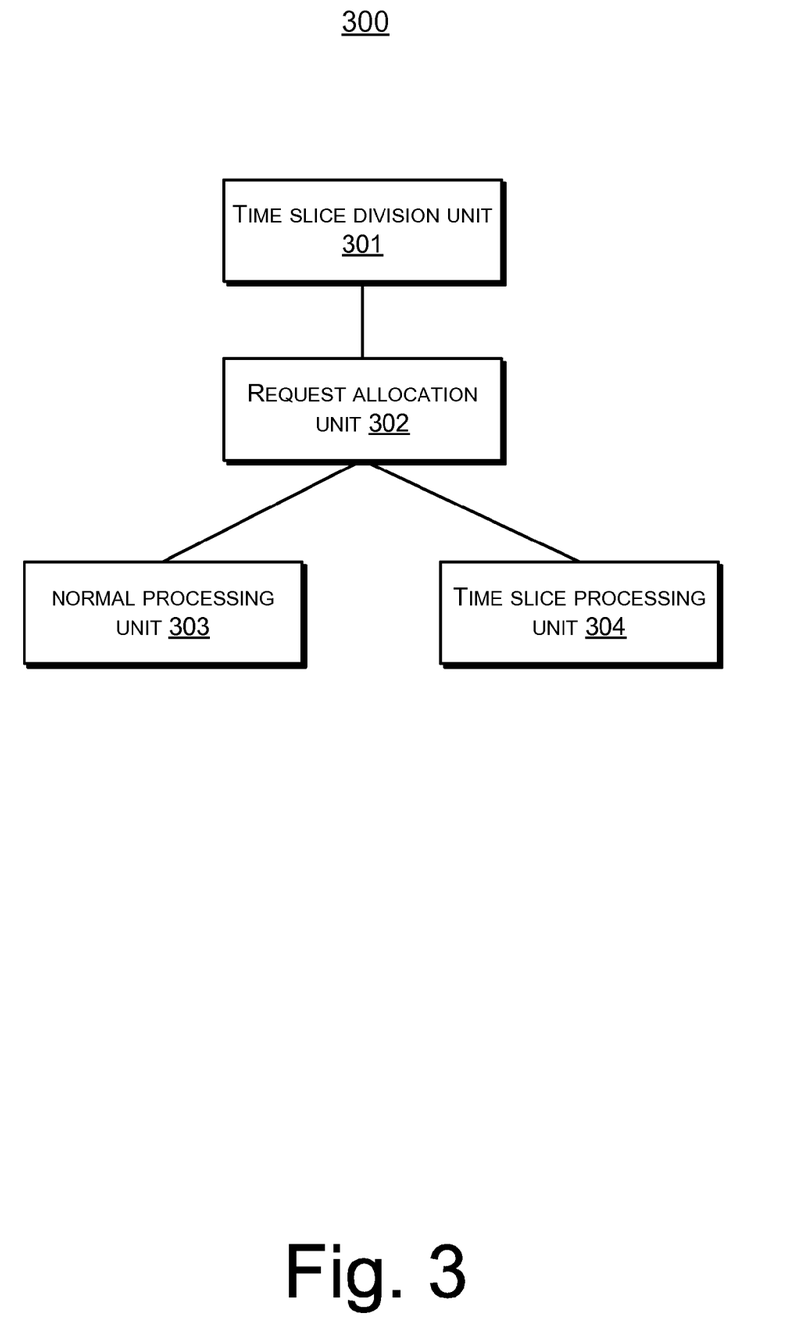
FIG. 3 shows a structural diagram of an exemplary apparatus of concurrent data processing in accordance with the present disclosure.

FIG. 3 shows a structural diagram of an exemplary apparatus 300 of concurrent data processing. The apparatus 300 primarily includes a time slicing unit 301, a request allocation unit 302, and a time slice processing unit 304. The time slicing unit 301 is used for dividing processing time into multiple time slices. The request allocation unit 302 is used for allocating a concurrent request to a corresponding time slice. The time slice processing unit 304 is used for iteratively processing requests in corresponding time slices according to an order of the time slices.

Preferably, the time slice processing unit 304 includes an iterative scheduling unit used for iteratively scheduling the requests in each time slice, and a combined processing unit used for determining whether requests of a same type exist in a request queue of a present time slice based on pre-determined requirements. If such requests exist, the combined processing unit combines the requests of the same type for processing. Otherwise, the processing unit 303 separately processes each request.

In one embodiment, the apparatus 300 further includes a normal processing unit 303 to process a request according to a normal handling process if the present request is not a concurrent request. In order to do this, the request allocation unit 302 may include a determination unit used for determining whether a present request is a concurrent request based on pre-determined configuration information. The request allocation unit 302 allocates the present request to a time slice if the present request is determined to be a concurrent request by the determination unit.

The normal processing unit 303 and the time slice processing unit 304 are two different processing channels. The normal processing unit 303 may conduct the processing using a method of existing technologies which is separately locks the accounts that are involved in a request, processes the request and performs bookkeeping, and unlocks the accounts upon completing the processing. The time slice processing unit 304, on the other hand, is used for performing special processing of a high-volume business or an account. As illustrated, the efficiency of concurrent processing may be improved using methods of time slicing and combining requests of a same type.

Herein, a "unit" is a device which is a tool or machine designed to perform a particular task or function. A unit or device can be a piece of hardware, software, a plan or scheme, or a combination thereof, for effectuating a purpose associated with the particular task or function. In addition, delineation of separate units does not necessarily suggest that physically separate devices are used. Instead, the delineation may be only functional, and the functions of several units may be performed by a single combined device or component. When used in a computer-based system, regular computer components such as a processor, a storage and memory may be programmed to function as one or more units or devices to perform the various respective functions. In one implementation environment, the apparatus 300 is implemented with one or more server computer.

Any missing details of the apparatus 300 shown in FIG. 3 can be referenced to the related portions of the processes shown in FIG. 1 and FIG. 2, and are not repeated herein.

Second Exemplary Embodiment

One important application of the disclosed method is in electronic commerce. The following uses an example of financial data processing based on a third-party transaction platform to illustrate in further detail how the disclosed method is applied in concurrent billing in electronic transaction processing.

In an electronic transaction between two parties, bill processing is implemented by a third-party payment platform. The third-party payment platform has virtual user accounts, which may include a buyer's virtual account, and a seller's virtual account. The buyer first transfers a transaction fund from a bank account into the buyer's virtual account. The transaction fund is then transferred from the buyer's virtual account into the seller's virtual account during a transaction. The transaction fund is under control of the third-party payment platform at that time, so the seller is unable to withdraw the transaction fund from the seller's virtual account. After the buyer confirms receiving goods, the transaction fund is transferred from the seller's virtual account into the seller's bank account by the third-party payment platform.

In the above transaction, a transfer between the two parties' virtual accounts within the third-party payment platform constitutes a billing request which can be processed using the method of the present disclosure. Such a billing request may be a payment request or a payment collection request, as described in the above transaction. With the third-party payment platform that handles transactions of multiple users, such payment requests tend to be concurrent requests.

The following uses an example of concurrent payment request for illustration. An account mentioned below refers to a virtual account. If multiple accounts send payments at the same time, the processing for each payment request includes three parts: (1) a billing system separates the requests into different processing channels based on configuration information; (2) a request is allocated to a time slice; and (3) the time slice is processed in turn. The process is described in further detail below with reference to FIGS. 4-6.

Figure 4:
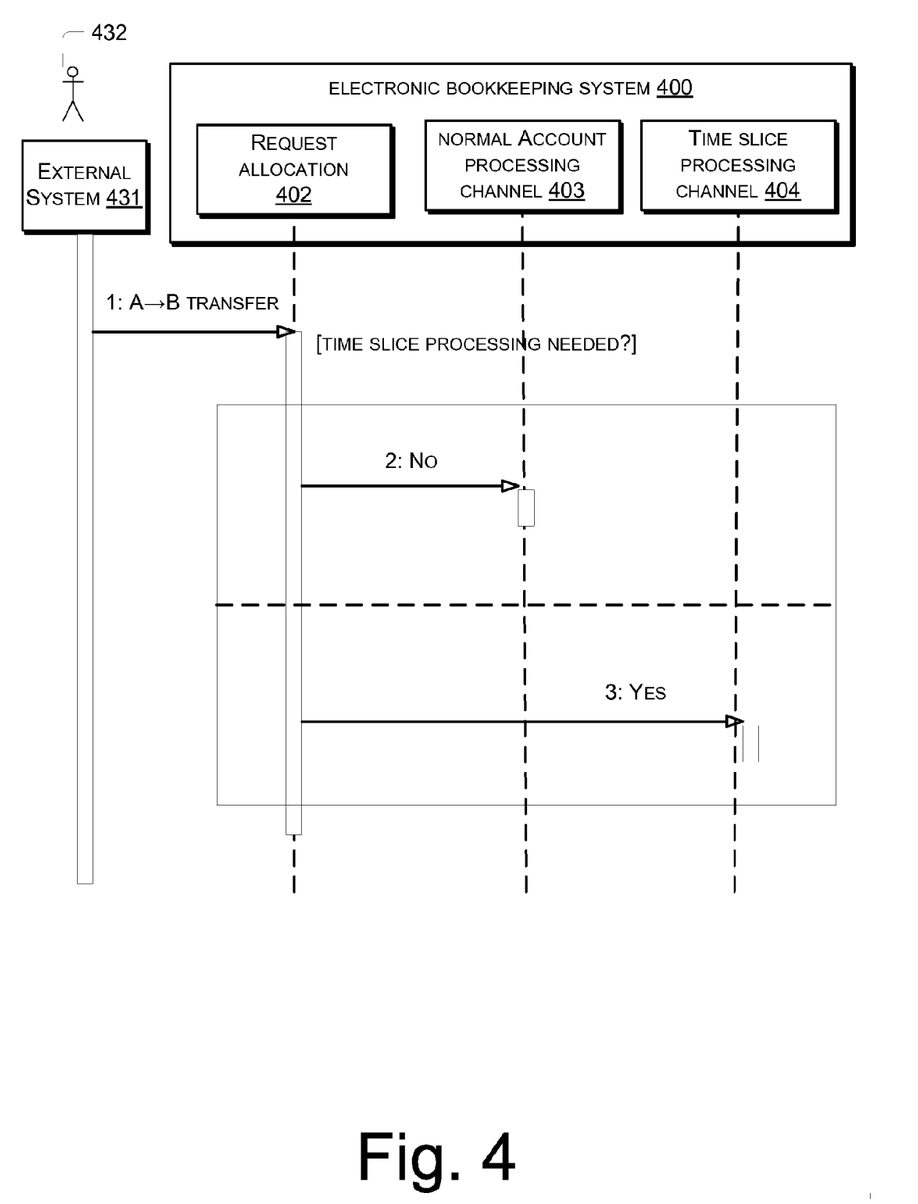
FIG. 4 shows a schematic diagram illustrating a process of separating processing channels by a billing system based on configuration information in accordance with a second exemplary embodiment.

FIG. 4 shows a schematic diagram illustrating a process 400 of separating processing channels by a billing system 401 based on configuration information.

In FIG. 4, an external system 431 refers to a system external to the billing system 401. An example of the external system 431 is an electronic transaction system or other business systems that generate requests through user interaction with user 432 (which may be a buyer or seller). The billing system 401 is implemented on a third-party payment platform, and is used for processing transfers between the virtual accounts on the third-party payment platform.

Assume that a transfer is being made from an account A to an account B in the billing system 401. Upon receiving a request from the external system 431, the billing system 401 determines whether the request is directed towards a high-volume business or a high-volume account involving high concurrency transaction. If yes, request allocation unit 402 allocates the request to a time slice processing channel 404, which processes requests using a time-slice based method as disclosed herein. Further detail of this time slice-based process is described with reference to FIG. 5 bill. If the request is determined to be not directed toward a high-volume business or account, the request is allocated to a normal billing processing channel 403 to be processed using an existing technological method (i.e., a method which separately locks, conducts bookkeeping, and unlocks the two accounts that are involved in the request). The above process is performed for every request received from the external system 431.

Figure 5:
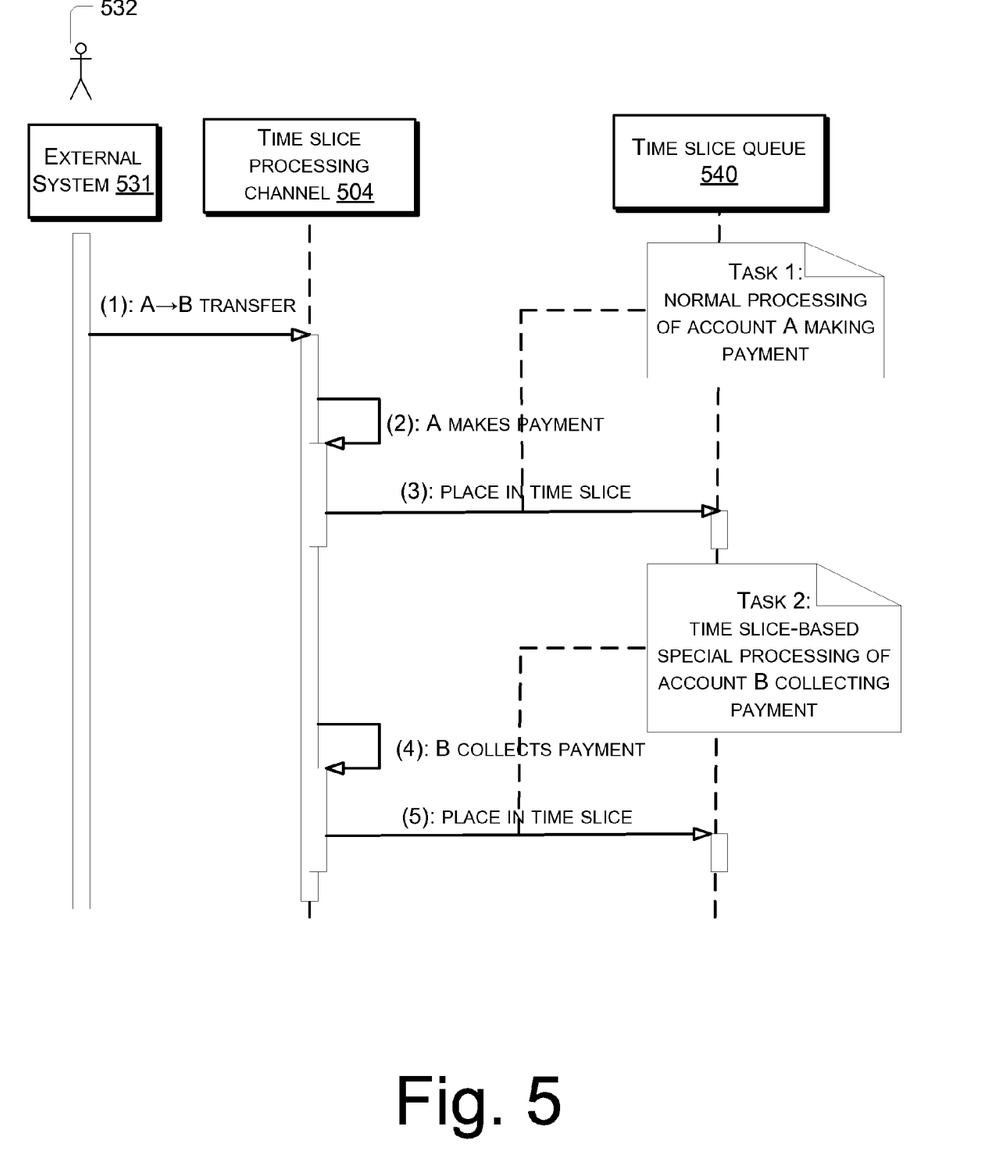
FIG. 5 shows a schematic diagram illustrating a process of allocating a request to a time slice in accordance with the second exemplary embodiment.

FIG. 5 shows a schematic diagram of a process 500 allocating a request to a time slice. If a request received from the external system 531 (through interaction with user 532) is allocated to the time slice processing channel 504, the request is placed in a corresponding time slice to wait for processing. The corresponding time slice may be selected according to the time of receiving the request. If multiple requests are placed in the same time slice, a request queue 540 of this time slice is formed.

A typical request involves a transfer of funds between two accounts. One example is making a payment and another is collecting a payment. As illustrated in FIG. 5, after a request for transferring funds from the account A to the account B is placed in a time slice, the time slice processing channel 504 separates the account A's payment operation and the account B's payment collection operation into two tasks which are arranged in the time slice's queue 540. Task 1 is account A making payment, while Task 2 is account B that collects the payment.

Figure 6:
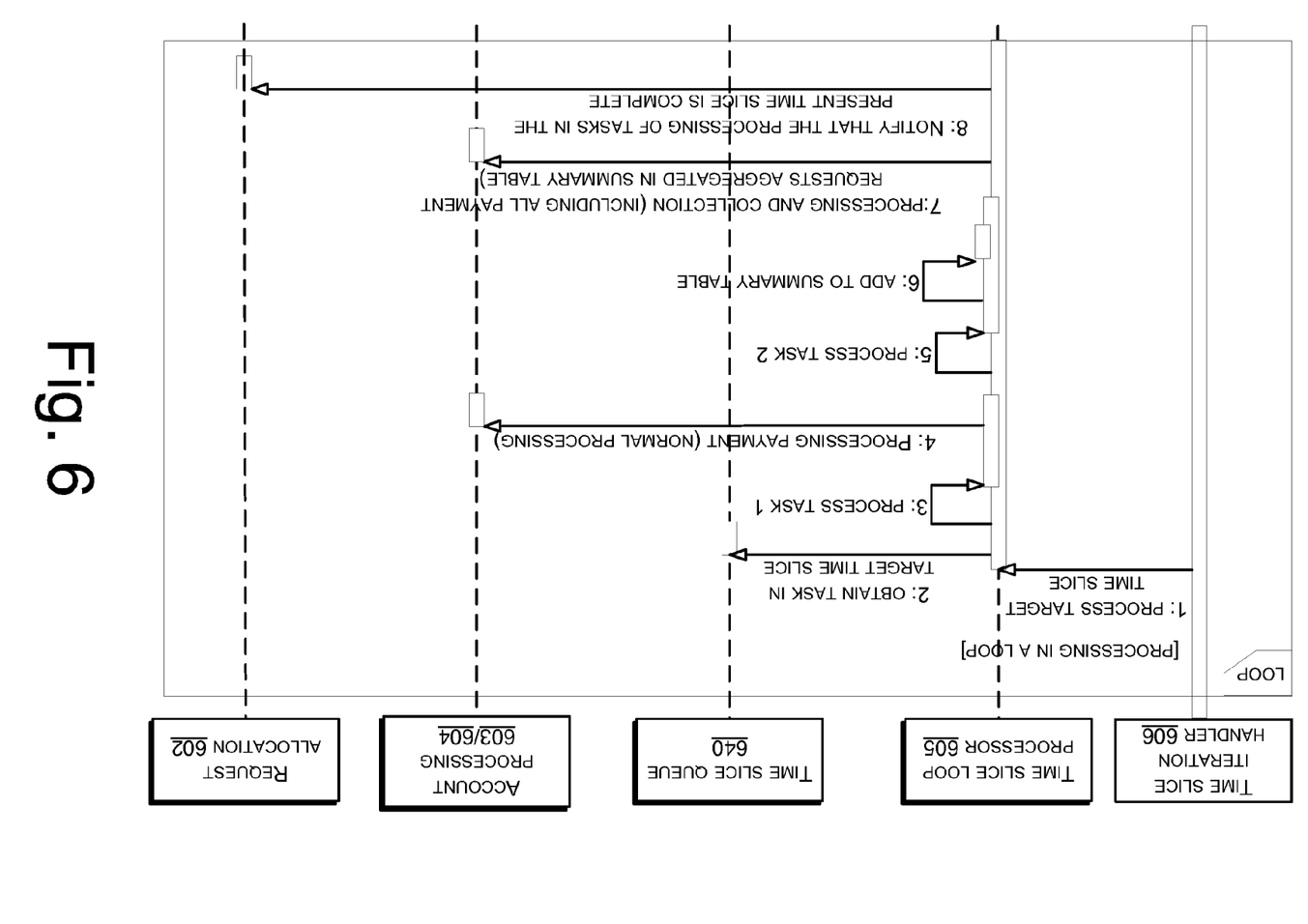
FIG. 6 shows a schematic diagram illustrating a procedure of processing a time slice in accordance with the second exemplary embodiment.

FIG. 6 shows a process 600 of processing the time slice assigned to the above described request. In FIG. 6, a request allocation unit 602 allocates a time slice to each transaction request. A time slice iteration handler 606 is used for scheduling iterative processing of requests in each time slice's queue 640. For a target time slice that is presently scheduled, Task 1 (account A making payment) in the target time slice's queue 640 is first obtained for payment making processing. Subsequently, Task 2 (account B collecting the payment) is obtained for payment collection processing. After the Task 1 and the Task 2 are completely processed, processing results of the Task 1 and the Task 2 are returned to the external system (531).

Because the illustrated example is concerned with processing of concurrent payment requests (i.e., multiple accounts sending payments to one recipient account), bookkeeping is conducted just once for each account that makes the payment (the account A), while bookkeeping for the recipient account (the account B) needs to be conducted multiple times. Therefore, the account A is not a high-volume account involving high concurrency transactions, and only needs to be processed by the account processing unit 603/604 under normal account processing. Specifically, the account A is locked, processed for bookkeeping, and unlocked for each payment request. The bookkeeping may include voucher recording and account balance update.

In comparison, the account B is a high-volume account involving high concurrency transactions, and therefore may receive multiple requests that are placed in a same time slice. Preferably, in order to reduce frequencies of locking and unlocking of the account B, requests of a same type can be combined and treated as a single request for processing. The Task 2 of multiple payments is therefore considered combinable and can be added to a general summary table. The summary table collectively records all requests of same type in a same time slice. Combinable payment requests in the summary table are subsequently processed collectively by the account processing unit 603/604 as if these requests were a single request. That is, the multiple requests for payment collection can be completed by conducting a single cycle of locking, bookkeeping and unlocking operations.

For example, request of payment A→B and request of payment C→B are placed into a time slice 1 as shown in a table below. After this time slice has been processed, ten dollars are deducted from the account A, and twenty dollars are deducted from the account C. For the high-volume account involving high concurrency transaction B, a result of combined processing is to add thirty dollars in one time.

TABLE 1

| Request | | Time Slice | Combination | |
|---|---|---|---|---|
| A→B | 10 dollars | Slice 1 | A | −10 |
| C→B | 20 dollars | | C | −20 |
| | | | B | +30 |
| E→D | 5 dollars | Slice 2 | E | −20 |
| E→F | 15 dollars | | D | +5 |
| | | | F | +15 |

Similarly, concurrent payment requests E→D and E→F are placed in a time slice 2. When this time slice is processed, the concurrent account E is processed in combination (i.e., twenty dollars are deducted in one time), while five dollars are added to the account D, and fifteen dollars are added to the account F.

After the current time slice is completely processed, the account processing unit 603/604 generates notification of the process completion of the current time slice in the system.

The present disclosure further provides an electronic bookkeeping system to implement the concurrent processing method described above.

Figure 7:
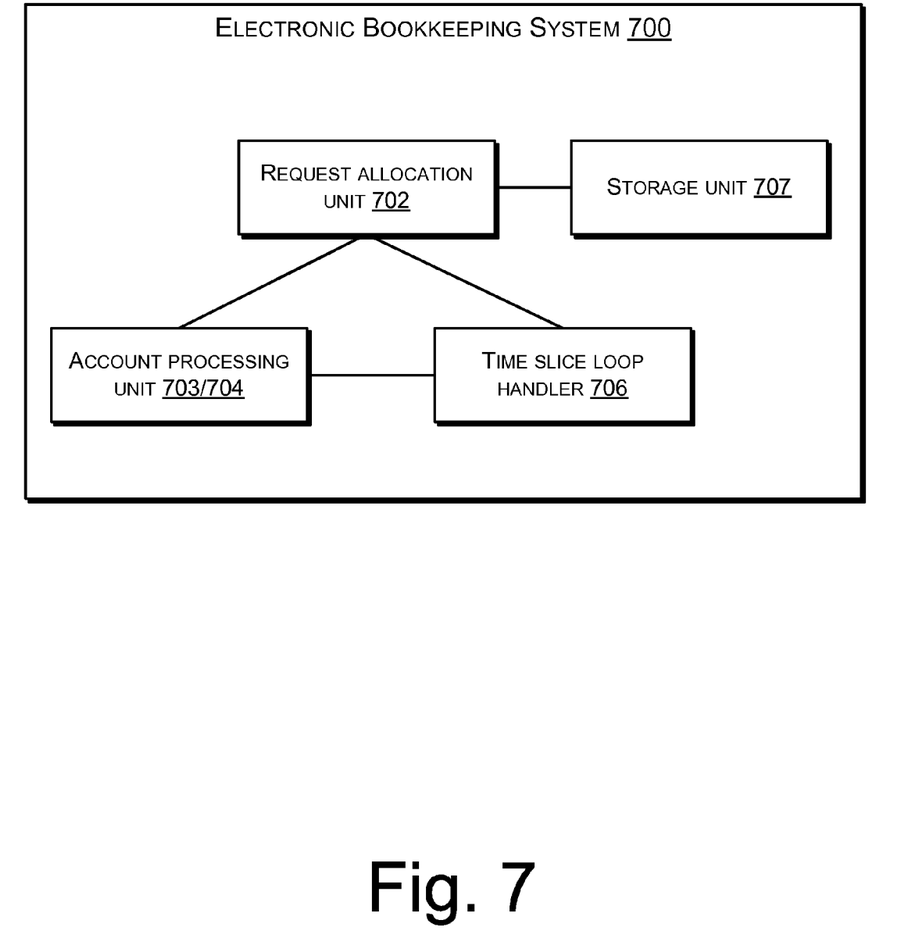
FIG. 7 shows a structural diagram of an exemplary electronic bookkeeping system in accordance with the present disclosure.

FIG. 7 shows a structural diagram of an electronic bookkeeping system 700 in accordance with the exemplary embodiment. The system 700 includes a request allocation unit 702, account processing unit 703/704, a time slice iteration handler 706, and a storage unit 707.

The account processing unit 703/704 is used for processing transaction requests including conducting bookkeeping such as recording a voucher and updating an account balance. The storage unit 707 is used for storing transaction requests assigned to corresponding time slices, and can be implemented by a computer-readable memory or storage device. The request allocation unit 702 is used for allocating a concurrent transaction request to a corresponding time slice according to the time of the request. The time slice iteration handler 706 is used for iteratively processing the transaction requests in each time slice according to an order of the time slices. In one embodiment, the time slice iteration handler 706 determines whether requests of a same type exist in a request queue of a present time slice based on pre-determined requirements. If such requests exist, the time slice iteration handler 706 combines them to be collectively processed by the account processing unit 703/704. If such requests do not exist, a time slice iteration handler 706 lets the account processing unit 703/704 process the requests separately.

Preferably, the request allocation unit 702 may be further configured to determine whether a present request is a concurrent request based on pre-determined configuration information, and to allocate the present request to a time slice for time slice-based processing if the present request is a concurrent request, or send the present request to the account processing unit 703/704 for normal bookkeeping if the present request is not a concurrent request.

When used in a computer-based system, regular computer components such as a processor, a storage and memory may be programmed to function as one or more units or devices to perform the various respective functions. In one implementation environment, the electronic bookkeeping system 700 is implemented with one or more server computer.

The above-described techniques may be implemented with the help of one or more computer-readable media containing computer-executable instructions. The computer computer-executable instructions enable a computer processor to perform a competitive resource allocation in accordance with the techniques described herein. It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

The electronic bookkeeping system 700 differs from the conventional request-centered processing in its using time slice-centered processing. In some embodiments, the system 700 collectively processes requests of a same type within a same time slice. The method may improve the efficiency of accessing a same resource involving high-volume business, reduce frequencies of resource locking and unlocking, and decreasing the pressure on the system 700.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of business transaction data processing, the method comprising:

receiving a plurality of requests for business transaction data processing, each request being associated with at least an account of a first party engaged in a business transaction with a second party;

dividing processing time of a business transaction data processing system into multiple time slices, wherein the business transaction data processing system is controlled by a third party;

allocating at least some of the plurality of requests to the multiple time slices, by at least:

determining whether the account of a present request to be allocated and the account of a previously allocated request are a same account, the previously allocated request being previously allocated to a first time slice of the multiple time slices, allocating the present request to the first time slice based at least in part on the respective accounts of the present request and the previously allocated request being the same account, and allocating the present request to a second time slice that is different from the first time slice in response to the respective accounts of the present request and the previously allocated request being not the same account; and iteratively processing the allocated requests of the corresponding time slices, wherein iteratively processing the allocated requests comprises:
processing the multiple time slices,
determining whether a present time slice being processed has a request queue containing multiple requests, and
collectively processing the multiple requests contained in the present time slice if affirmative, wherein the account associated with the multiple requests is locked during the
processing of the multiple requests; and
processing the present request according to a normal handling process in response to the present time slice being processed containing only the present request.

2. The method as recited in claim 1, wherein each request is allocated to a corresponding time slice based at least in part on a receipt time of the request.

3. The method as recited in claim 1, wherein the plurality of requests for business data processing comprises requests for financial transaction processing including financial account bookkeeping.

4. The method as recited in claim 1, wherein the collectively processing the multiple requests contained in the present time slice comprises:
locking the account associated with each of the multiple requests during the processing of the multiple requests;
calculating a value of a net change in an amount of the account associated with each of the multiple requests in accordance with the multiple requests while the account is locked;
changing the amount of the account associated with each of the multiple requests in accordance with the value of the net change while the account is locked; and
unlocking the account associated with each of the multiple requests after the amount of the account is changed.

5. The method as recited in claim 4, wherein for each request, the account associated with the first party is a first account, wherein each request is associated with a second account of the second party, wherein the collectively processing the multiple requests contained in the present time slice comprises:
for each respective request of the multiple requests,
locking the second account associated with the respective request,
changing an amount of the second account with the respective request in accordance with the respective request, and
unlocking the second account associated with the respective request after the amount of the second account is changed.

6. The method as recited in claim 1, wherein the multiple requests contained the present time slice are of a same type.

7. An apparatus of business transaction data processing, the apparatus comprising:
at least one processor;
at least one computer-readable storage storing instructions which, when executed by the at least one processor, implement:
a time slicing unit configured to divide processing time into multiple time slices;
a request allocation unit configured to receive a plurality of requests for business transaction data processing, wherein each request is associated with at least an account of a first party engaged in a business transaction with a second party, and configured to allocate at least some of the plurality of requests to the multiple time slices by at least:
determining whether the account of a present request to be allocated and the account of a previously allocated request are a same account, the previously allocated request being previously allocated to a first time slice of the multiple time slices,
allocating the present request to the first time slice based at least in part on the respective accounts of the present request and the previously allocated request being the same account, and
allocating the present request to a second time slice that is different from the first time slice in response to the respective accounts of the present request and the previously allocated request being not the same account;
a time slice processing unit configured to iteratively process the allocated requests of the corresponding time slices and configured to determine whether a present time slice being processed has a request queue containing multiple requests, and if affirmative collectively process the multiple requests contained in the present time slice, wherein the account associated with the multiple requests is locked during the processing of the multiple requests; and
a normal processing unit configured to process a present request according to a normal handling process in response to the present time slice being processed containing only the present request.

8. The apparatus as recited in claim 7, wherein the multiple requests contained the present time slice are of a same type.

9. The apparatus as recited in claim 7, wherein each request is allocated to a corresponding time slice based at least in part on a receipt time of the request.

10. The apparatus as recited in claim 7, wherein the plurality of requests for business data processing comprises requests for financial transaction processing including financial account bookkeeping.

11. The apparatus as recited in claim 7, wherein the time slice iteration handler processing unit collectively processes the multiple requests contained in the present time slice by:
locking the account associated with each of the multiple requests during the processing of the multiple requests;
calculating a value of a net change in an amount of the account associated with each of the multiple requests in accordance with the multiple requests while the account is locked;
changing the amount of the account associated with each of the multiple requests in accordance with the value of the net change while the account is locked; and
unlocking the account associated with each of the multiple requests after the amount of the account is changed.

12. The apparatus as recited in claim 11, wherein for each request, the account associated with the first party is a first account, wherein each request is associated with a second account of the second party, wherein the time slice iteration handler processing unit collectively processes the multiple requests contained in the present time slice by:
for each respective request of the multiple requests,
locking the second account associated with the respective request,
changing an amount of the second account with the respective request in accordance with the respective request, and unlocking the second account associated with the respective request after the amount of the second account is changed.

13. An electronic bookkeeping system adapted for receiving and processing a plurality of billing requests, the system comprising:
- an account processing unit configured to conduct bookkeeping;
- a storage device storing the received billing requests and data related to the billing requests;
- a request allocation unit configured to allocate at least some of the received requests to corresponding multiple time slices and configured to determine whether a present request being processed by the request allocation unit is concurrent with a request previously allocated to a given time slice, and to allocate the present request to the given time slice only if the present request is concurrent with the request previously allocated to the given time slice, wherein the concurrency condition is satisfied if the present request and request previously allocated are directed to a same account; and
- a time slice iteration handler processing unit configured to iteratively process the allocated billing requests according to the corresponding time slices, the time slice iteration handler being configured to determine whether each time slice has a request queue containing multiple allocated request, and if affirmative combining the multiple allocated requests for collective bookkeeping by the account processing unit.

14. The electronic bookkeeping system as recited in claim 13, the system being a part of a third-party payment processing platform.

15. The electronic bookkeeping system as recited in claim 13, wherein the request allocation unit is configured to receive the plurality of requests from at least one system that is external to the electronic bookkeeping system.

16. The electronic bookkeeping system as recited in claim 13, wherein the multiple allocated requests contained in a given time slice are of a same type.

* * * * *